(12) United States Patent
Shibata et al.

(10) Patent No.: US 11,695,455 B2
(45) Date of Patent: Jul. 4, 2023

(54) WIRELESS COMMUNICATION SYSTEM, RELAY DEVICE, AND RECEIVING DEVICE

(71) Applicant: NIPPON TELEGRAPH AND TELEPHONE CORPORATION, Tokyo (JP)

(72) Inventors: Naotaka Shibata, Musashino (JP); Jun Terada, Musashino (JP); Shinsuke Ibi, Musashino (JP); Seiichi Sanpei, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/626,110

(22) PCT Filed: Jul. 15, 2020

(86) PCT No.: PCT/JP2020/027435
§ 371 (c)(1),
(2) Date: Jan. 10, 2022

(87) PCT Pub. No.: WO2021/010408
PCT Pub. Date: Jan. 21, 2021

(65) Prior Publication Data
US 2022/0294498 A1  Sep. 15, 2022

(30) Foreign Application Priority Data
Jul. 18, 2019 (JP) .................................. 2019-132666

(51) Int. Cl.
*H04B 7/0417* (2017.01)
*H04B 7/0426* (2017.01)
(Continued)

(52) U.S. Cl.
CPC ......... *H04B 7/0417* (2013.01); *H04B 7/0426* (2013.01); *H04B 7/0478* (2013.01); *H04W 16/28* (2013.01)

(58) Field of Classification Search
CPC .. H04B 7/0417; H04B 7/0426; H04B 7/0478; H04W 16/28
See application file for complete search history.

(56) References Cited

U.S. PATENT DOCUMENTS 8,873,613 B2 * 10/2014 Aubert .............. H04L 25/03242
375/232
10,387,534 B2 * 8/2019 Schwartz ................ G06F 17/16
(Continued)

OTHER PUBLICATIONS

Tomoaki Ohtsuki, "Communication Technology: Basic Knowledge and Its Trend [III] : Error-Correction Coding", Journal of the Institute of Electronics, Information and Communication Engineers, vol. 90, No. 7, 2007, pp. 549-555.
(Continued)

*Primary Examiner* — Jaison Joseph
(74) *Attorney, Agent, or Firm* — Harness, Dickey & Pierce, P.L.C.

(57) ABSTRACT

A relay device relaying, to a reception device, a signal stream transmitted by a transmission device through MIMO transmission, the relay device including a lattice base reduction processing unit transforming bases of the signal stream transmitted by the transmission device through MIMO transmission, to increase orthogonality of a lattice of the signal stream, a MIMO equalization unit detecting, by equalization, reception symbols in the signal stream with the bases transformed by the lattice base reduction processing unit, a symbol quantization unit performing quantization by mapping the reception symbols detected by the MIMO equalization unit, to a region on a complex plane delimited by
(Continued)

quantization threshold values, and a transmission unit transmitting, to the reception device, at least a signal quantized by the symbol quantization unit.

7 Claims, 9 Drawing Sheets

(51) Int. Cl.
*H04B 7/0456* (2017.01)
*H04W 16/28* (2009.01)

(56) References Cited

U.S. PATENT DOCUMENTS

| | | | | |
|---|---|---|---|---|
| 11,309,992 | B2* | 4/2022 | Landis | H04B 7/086 |
| 2007/0206697 | A1* | 9/2007 | Qiu | H04L 25/03006 |
| | | | | 375/267 |
| 2007/0217537 | A1* | 9/2007 | Berenguer | H04L 25/03242 |
| | | | | 375/267 |
| 2008/0043864 | A1* | 2/2008 | Fujii | H04L 25/067 |
| | | | | 375/341 |
| 2011/0158341 | A1* | 6/2011 | Tsai | H04B 7/0452 |
| | | | | 375/267 |
| 2012/0219082 | A1* | 8/2012 | Sarperi | H04L 25/03203 |
| | | | | 375/267 |
| 2013/0243068 | A1* | 9/2013 | Aubert | H04B 7/0885 |
| | | | | 375/232 |
| 2014/0185716 | A1* | 7/2014 | Aubert | H04L 25/03242 |
| | | | | 375/341 |
| 2014/0192936 | A1* | 7/2014 | Fukawa | H04B 7/0413 |
| | | | | 375/341 |
| 2014/0254727 | A1* | 9/2014 | Kim | H04B 7/0663 |
| | | | | 375/340 |

OTHER PUBLICATIONS

Shinsuke Ibi and Seiichi Sampei, "A Study on Optimizations of Quantization Threshold for Decode-Quantize-Forward Relaying", IEICE Technical Report, vol. 113, No. 456, 2014, pp. 181-186.

Kenji Miyamoto et al., "Proposal on Functional-Split Scheme of Base Stations for Future Radio Access", IEICE Technical Report, vol. 115, No. 123, 2015, pp. 33-38.

Xinyue Ling et al., "Optimization of Quantization Levels for Quantize-and-Forward Relaying with QAM Signaling", Proceedings, APSIPA Annual Summit and Conference 2018, Nov. 12, 2018, pp. 159-164.

\* cited by examiner

(a) 16QAM TRANSMISSION SIGNAL $x_m^c$ (b) TRANSFORMED TRANSMISSION SIGNAL $b_{i,m}^c$

WIRELESS COMMUNICATION SYSTEM, RELAY DEVICE, AND RECEIVING DEVICE

CROSS-REFERENCE TO RELATED APPLICATIONS

This application is a 371 U.S. National Phase of International Application No. PCT/JP2020/027435, filed on Jul. 15, 2020, which claims priority to Japanese Patent Application No. 2019-132666, filed on Jul. 18, 2019. The entire disclosures of the above applications are incorporated herein by reference.

TECHNICAL FIELD

The present invention relates to a radio communication system, a relay device, and a reception device.

BACKGROUND ART

For radio communication systems, a relay communication system has been studied that utilizes a plurality of relay devices present between a transmission device and a reception device to improve communication quality.

For example, when a received radio signal is demodulated, a method referred to as soft decision demodulation may be used that outputs a ratio of real values referred to as likelihood, which indicates a probability that a transmitted signal bit is 0 or 1, instead of outputting a bit value of 0 or 1 as a demodulation result. The output of soft decision demodulation is referred to as a log-likelihood ratio or LLR (see, for example, NPL1).

In general, a larger positive value of the LLR indicates a higher possibility that the signal bit is 1, and a larger negative value of the LLR indicates a higher possibility that the signal bit is 0. The relay communication systems include a decode-quantize-and-forward communication system that quantizes an LLR detected by a relay device in communication between a transmission device and the relay device and that transfers the LLR to a reception device (for example, see NPL2).

On the other hand, for a radio communication system, and particularly a mobile communication system, a configuration has been studied in which the functions of a base station device communicating wirelessly with terminals are divided into two physically separated devices referred to as a Baseband Unit (BBU) and a Remote Radio Head (RRH) in order to increase the flexibility of installation of the base station device. As a function division scheme for the BBU and RRH, a function division scheme referred to as SPP (Split-PHY Processing) has been studied in which the BBU is equipped with a Media Access Control (MAC) layer and higher functions, and a coding/decoding function corresponding to a part of physical layer functions and in which the RRH is equipped with the physical layer functions other than the coding/decoding function (see, for example, NPL3).

Communication between a relay device and a reception device requires transmission, for one information bit, of a data amount corresponding to the number of LLR quantization bits, and thus requires a transmission capacity corresponding to the data rate between a transmission device and the reception device multiplied by the number of LLR quantization bits, leading to a English Translation of large transmission capacity. Thus, a technique has been proposed in which reception symbols for a received signal are mapped to a region on a complex plane delimited by quantization threshold values and in which the region subjected to the mapping is transformed into quantization symbols identified by quantized values, the quantization symbols being then transmitted instead of quantization bits. This enables communication with a reduced transmission capacity while improving communication quality (see, for example, NPL4).

CITATION LIST

Non Patent Literature

NPL1: OHTSUKI Tomoaki, "Communication Technology: Basic Knowledge and Its Trend [III]: Error-Correction Coding", The Journal of the Institute of Electronics, Information and Communication Engineers (IEICE), July 2007, Vol. 90, No. 7, pp. 549-555

NPL2: IBI Shinsuke and one other person, "Study about Optimization of Decode-Quantize-and-Forward", The Institute of Electronics, Information and Communication Engineers (IEICE) Technical Report, March 2014, vol. 113, no. 456, RCS2013-336, pp. 181-186

NPL3: MIYAMOTO Kenji and three other persons, "Proposal for Functional-Split Scheme of Base Stations for Future Radio Access," The Institute of Electronics, Information and Communication Engineers (IEICE) Technical Report, July 2015, vol. 115, no. 123, CS2015-15, pp. 33-38

NPL4: X. Ling et al., "Optimization of Quantization Levels for Quantize-and-Forward Relaying with QAM Signaling", Proceedings, AP SIPA Annual Summit and Conference 2018, November 2018, pp. 159-164

SUMMARY OF THE INVENTION

Technical Problem

However, there have been cases where the use of linear processing such as Zero forcing (ZF) prevents sufficient signal detection due to the effect of noise components. Additionally, in Maximum Likelihood Detection (MLD), the complexity of calculation exponentially increases. Thus, in the related art, there has been a problem in that an increased number of antennas or an increased number of levels for modulation signal significantly increases the transmission capacity or the complexity of calculation for reduction of determination errors.

An object of the present invention is to provide a radio communication system, a relay device, and a reception device that can reduce determination errors while suppressing an increase in the complexity of calculation.

Means for Solving the Problem

A radio communication system according to an aspect of the present invention is a radio communication system in which a signal stream transmitted by a transmission device through MIMO transmission is relayed to a reception device by a relay device, wherein the relay device includes a lattice base reduction processing unit transforming bases of the signal stream transmitted by the transmission device through MIMO transmission, to increase orthogonality of a lattice of the signal stream, a MIMO equalization unit detecting, by equalization, reception symbols in the signal stream with the bases transformed by the lattice base reduction processing unit, a symbol quantization unit performing quantization by mapping the reception symbols detected by the MIMO equalization unit, to a region on a complex plane delimited by quantization threshold values, and a transmission unit transmitting, to the reception device, at least a signal quantized by the symbol quantization unit, and the reception device includes a reception unit receiving the signal transmitted by the transmission unit, and a signal detection unit detecting the signal stream with the bases transformed by the lattice base reduction processing unit, in the signal received by the reception unit.

An aspect of the present invention provides a relay device relaying, to a reception device, a signal stream transmitted by a transmission device through MIMO transmission, the relay device including a lattice base reduction processing unit transforming bases of the signal stream transmitted by the transmission device through M IMO transmission, to increase orthogonality of a lattice of the signal stream, a MIMO equalization unit detecting, by equalization, reception symbols in the signal stream with the bases transformed by the lattice base reduction processing unit, a symbol quantization unit performing quantization by mapping the reception symbols detected by the MIMO equalization unit, to a region on a complex plane delimited by quantization threshold values, and a transmission unit transmitting, to the reception device, at least a signal quantized by the symbol quantization unit.

An aspect of the present invention provides a reception device according to an aspect of the present invention is a reception device receiving, via relay by a relay device, a signal stream transmitted by a transmission device through MIMO transmission, the reception device including a reception unit receiving the signal relayed by the relay device, and a signal detection unit detecting the signal stream with bases transformed in the signal received by the reception unit, to increase orthogonality of a lattice of the signal stream, based on a signal quantized by mapping symbols of the signal stream with the bases transformed, to a region on a complex plane delimited by quantization threshold values.

Effects of the Invention

According to the present invention, determination errors can be reduced with an increase in the complexity of calculation being suppressed.

BRIEF DESCRIPTION OF DRAWINGS

FIG. 3(*a*) is a diagram illustrating a signal point arrangement of a 16QAM transmission signal.

FIG. 3(*b*) is a diagram illustrating a signal point arrangement of a transformed transmission signal.

FIG. 9(*a*) is a diagram illustrating a constellation of a reception signal. FIG. 9(*b*) is a diagram illustrating a determination region for ZF. FIG. 9(*c*) is a diagram illustrating a determination region for MLD.

DESCRIPTION OF EMBODIMENTS

Figure 6:
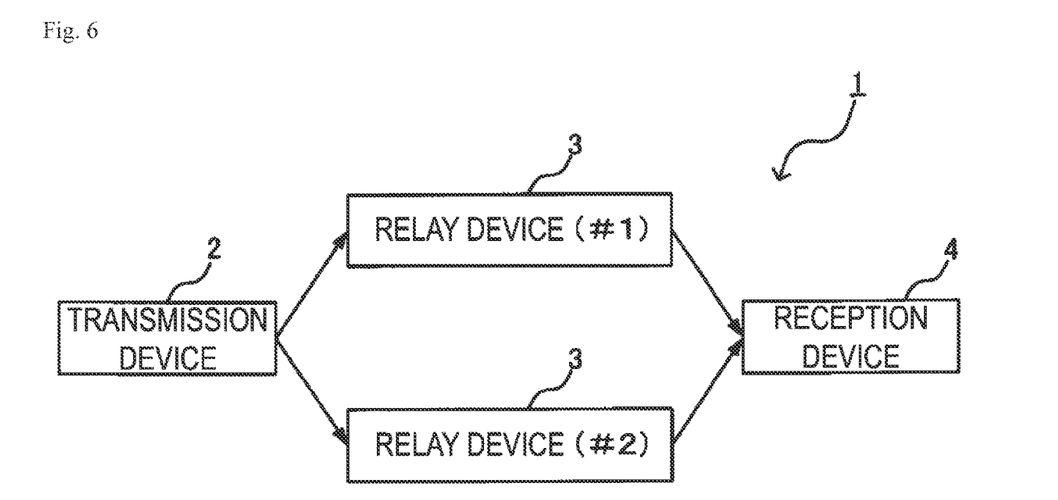
FIG. 6 is a diagram illustrating a configuration example of a radio communication system.

First, the background to the present invention will be described. FIG. 6 is a diagram illustrating a configuration example of a radio communication system 1. For example, the radio communication system 1 includes a transmission device 2, two relay devices 3, and a reception device 4. The number of relay devices 3 (N) may be any that is one or greater.

The transmission device 2 and the relay device 3 are wirelessly connected. The relay device 3 and the reception device 4 may be connected either by wire or wirelessly. Here, among the N relay devices 3, the n-th relay device is referred to as a relay device #n. In FIG. 6, N=2 (n=1, 2).

Figure 7:
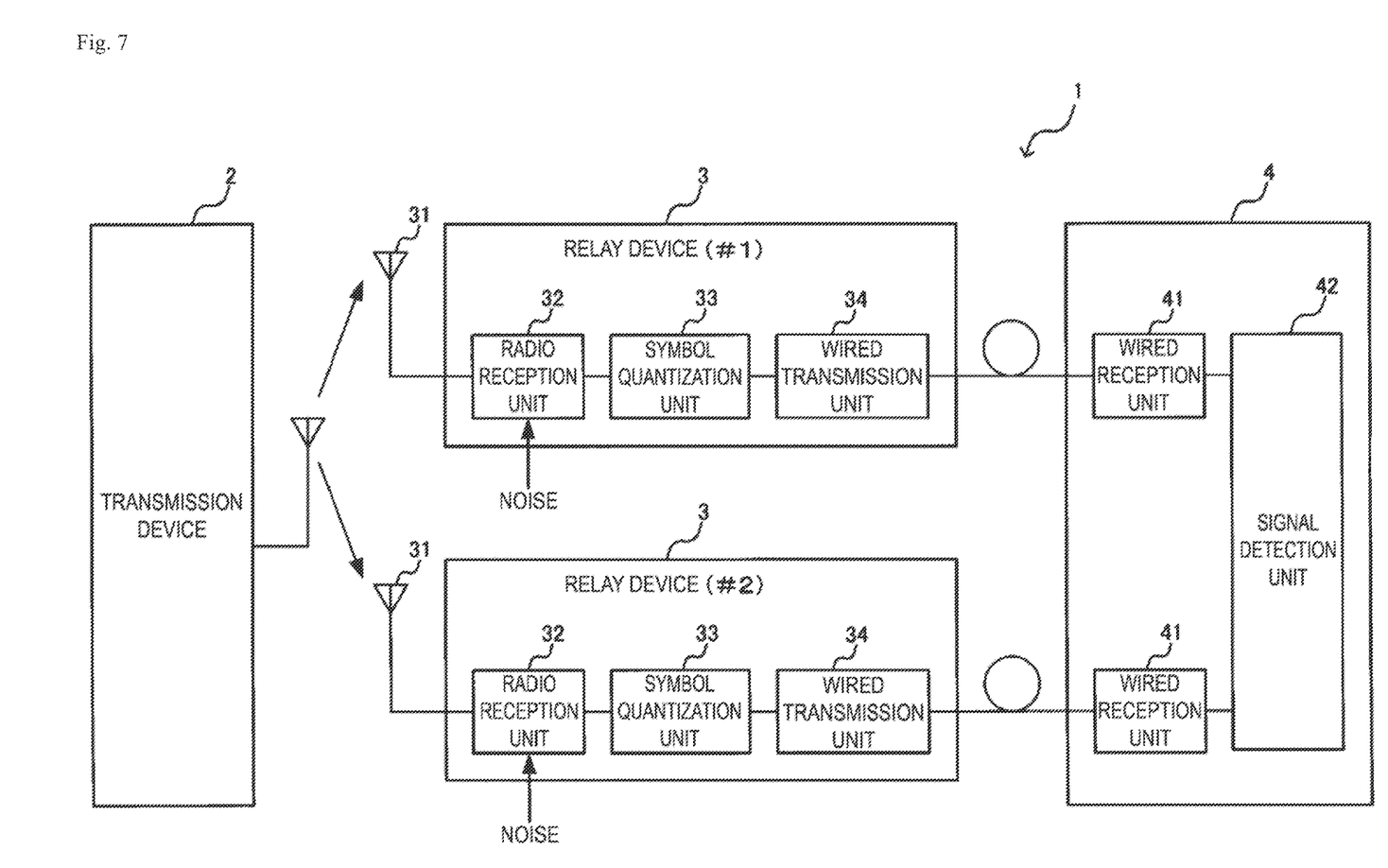
FIG. 7 is a diagram illustrating a specific configuration example of a radio communication system.

FIG. 7 is a diagram illustrating a specific configuration example of the radio communication system 1 illustrated in FIG. 6. As illustrated in FIG. 7, the radio communication system 1 is, for example, a decode-quantize-and-forward communication system including the transmission device 2, the two relay devices 3, and the reception device 4.

Each of the relay devices 3 includes an antenna 31, a radio reception unit 32, a symbol quantization unit 33, and a wired transmission unit 34, and relays, to the reception device 4, a signal stream transmitted by the transmission device 2.

The antenna 31 receives the signal stream transmitted by the transmission device 2 and outputs the signal stream to the radio reception unit 32. The radio reception unit 32 outputs, to the symbol quantization unit 33, the signal stream received via the antenna 31. Noise is included in the signal received by the radio reception unit 32.

The symbol quantization unit 33 maps the reception symbols of the signal stream received by the radio reception unit 32 to a region on a complex plane delimited by quantization threshold values, transforms the region subjected to the mapping into quantization symbols, and outputs, to the wired transmission unit 34, the quantization symbols resulting from the transform. The quantization symbols are information identifying regions by using quantized values. The wired transmission unit 34 is a transmission unit transmitting a signal for which a quantization symbol is configured, to the reception device 4 via a mobile optical network including, for example, wired optical fibers or the like.

The reception device 4 includes, for example, two wired reception units 41, which are identical in number to the relay devices 3, and a signal detection unit 42. Each of the wired reception units 41 receives a signal transmitted from a corresponding one of the relay devices 3 by wire and outputs the signal to the signal detection unit 42. The signal detection unit 42 performs signal detection by using quantization symbols configured for signals received by the respective wired reception units 41 from the relay device 3, and determines reception bits.

Furthermore, in order to respond to a demand for high speed and large capacity, the radio communication system 1 may employ a Multiple Input Multiple Output (MIMO) transmission technique that can achieve high spectral efficiency.

Figure 8:
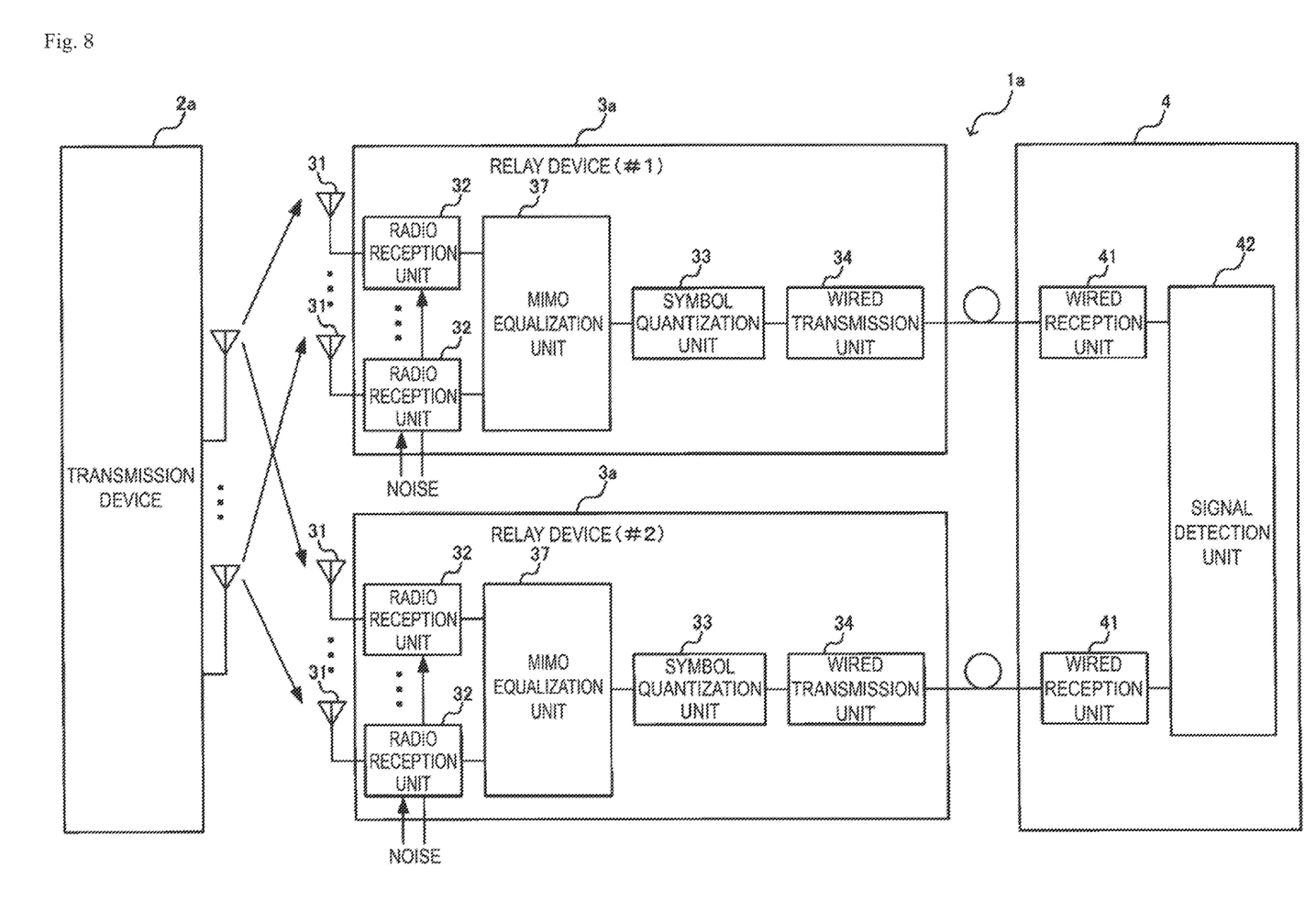
FIG. 8 is a diagram illustrating a configuration example of a radio communication system to which a MIMO transmission technology is applied.

FIG. 8 is a diagram illustrating a specific configuration example of a radio communication system (radio communication system 1*a*) in which the MIMO transmission technology is applied to a radio section. As illustrated in FIG. 8, the radio communication system 1*a* includes, for example, a transmission device 2*a*, two relay devices 3*a*, and the reception device 4. Components that are substantially the same as those of the radio communication system 1 illustrated in FIG. 7 are denoted by the same reference signs.

The transmission device 2a transmits a radio signal (a stream) to each of the relay devices 3a by MIMO transmission using a plurality of antennas.

Each of the relay devices 3a includes a plurality of antennas 31, a plurality of radio reception units 32, a MIMO equalization unit 37, a symbol quantization unit 33, and a wired transmission unit 34, and the transmission device 2a relays a signal stream transmitted through MIMO transmission to the reception device 4. The plurality of relay devices 3a may be configured to transmit radio MIMO transmission to the reception device 4.

In the relay device 3a, the plurality of antennas 31 receive the signal stream transmitted by the transmission device 2a, and outputs the signal stream to the plurality of radio reception units 32. The plurality of radio reception units 32 output, to the MIMO equalization unit 37, the signal streams received via the plurality of respective antennas 31. The signal stream received by each of the radio reception units 32 includes noise.

The MIMO equalization unit 37 detects, by equalization, reception symbols in the signal streams received by the plurality of radio reception units 32 and outputs the reception symbols to the symbol quantization unit 33.

Now, operations for soft decision in the radio communication system 1a will now be described by using, as an example, 2×2 MIMO in which the transmission device 2a and each relay device 3a use two antennas each. However, for simplification of description, real number signals are assumed.

Equation (1) below indicates a transmission signal, which is assumed to be an integer.

[Math. 1]

$$x_c = [x_1^c, x_2^c] \quad (1)$$

where $x_1^c$, $x_2^c$ is an integer, and hereinafter, a variable with, $\cdot^c$ is a complex number field, a variable without, $\cdot^c$ is a real number field, and $\cdot^T$ is transposition.

Equation (2) below indicates a channel matrix.

[Math. 2]

$$H^c = \begin{bmatrix} 2 & 3 \\ 0 & 1 \end{bmatrix} \quad (2)$$

Equation (3) below indicates a reception signal.

[Math. 3]

$$y^c = [y_1^c, y_2^c]^T = H^c x^c = [2x_1^c + 3x_2^c, x_2^c]^T \quad (3)$$

Figure 9:
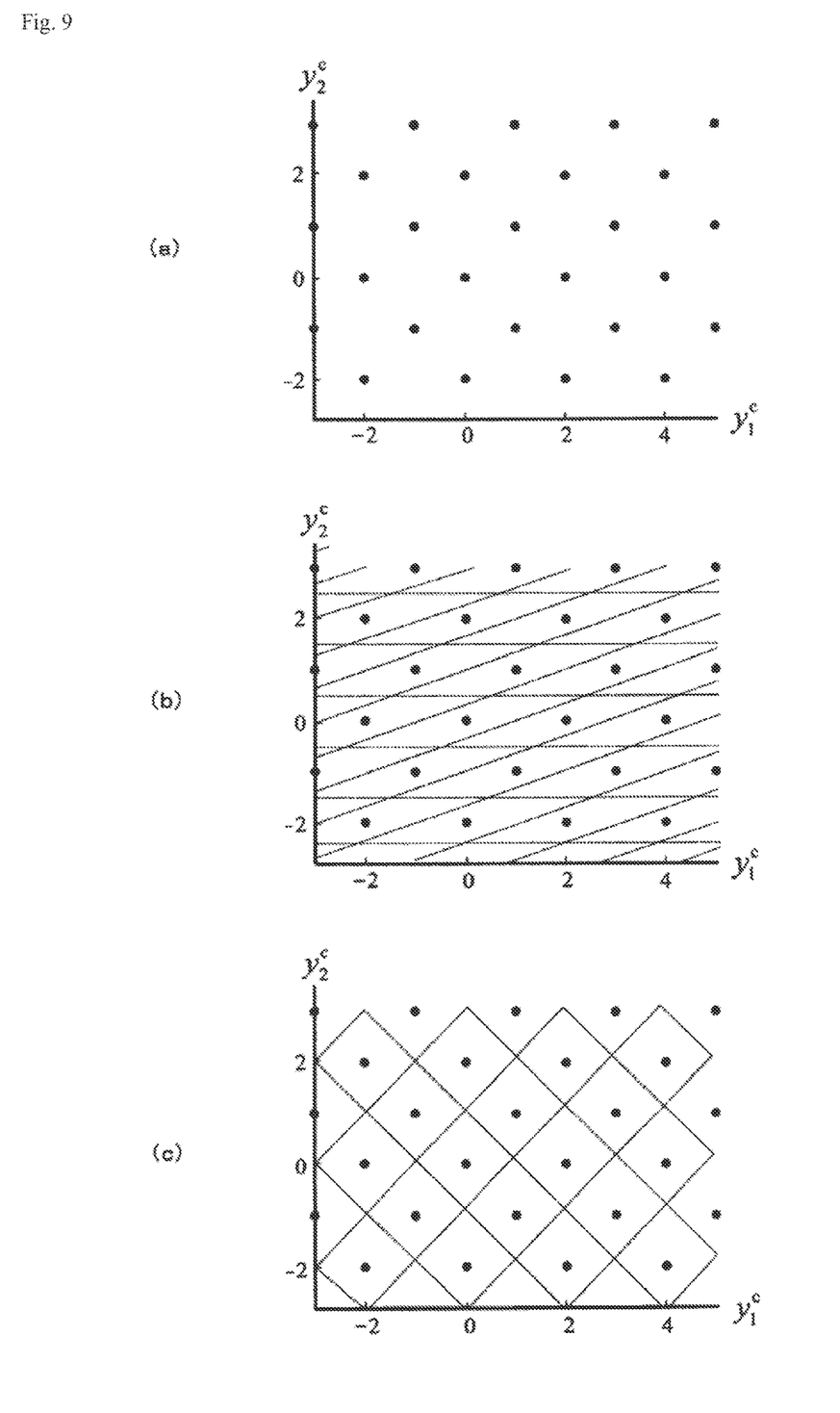

The constellation (signal point arrangement) in this case is illustrated in FIG. 9. FIG. 9(a) is a diagram illustrating the constellation of a reception signal. FIG. 9(b) is a diagram illustrating a determination region for ZF. FIG. 9(c) is a diagram illustrating a determination region for maximum likelihood detection (MLD).

As illustrated in FIG. 9(b), in a case where the reception bits are determined by ZF, even slight noise causes erroneous determination because bases $[0\ 2]^T$ and $[1\ 3]^T$ have low orthogonality, leading to a determination region shaped like an elongated parallelogram. In other words, the use of linear processing such as ZF prevents sufficient detection performance from being ensured.

As illustrated in FIG. 9(c), determination of the reception bits by MLD reduces the determination errors compared to the case illustrated in FIG. 9(b) because the bases have high orthogonality, leading to a determination region in a generally square shape. However, the determination by MLD is not practical because increased numbers of modulation levels and transmission antennas significantly increase the complexity of calculation.

Figure 1:
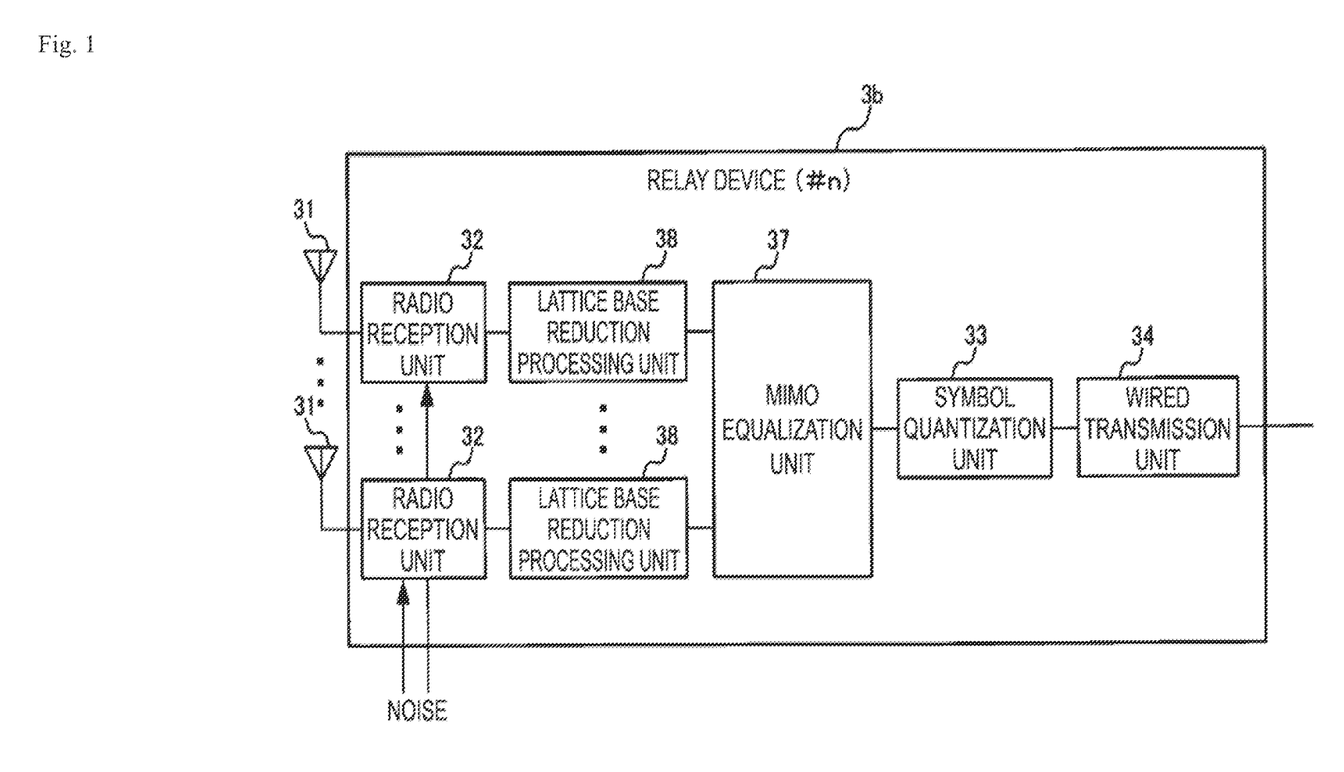
FIG. 1 is a diagram illustrating a configuration example of a relay device.

Now, another configuration example of the relay device 3a (relay device 3b) will be described. FIG. 1 is a diagram illustrating a configuration example of the relay device 3b. The relay device 3b is a relay device that constitutes a radio communication system that realizes MIMO transmission instead of the relay device 3a of the radio communication system 1a illustrated in FIG. 8.

The relay device 3b includes the plurality of antennas 31, the plurality of radio reception units 32, a plurality of lattice base reduction processing units 38, the MIMO equalization unit 37, the symbol quantization unit 33, and the wired transmission unit 34, and the transmission device 2a relays, to the reception device 4, the signal stream transmitted through MIMO transmission. A plurality of relay devices 3b may be configured to perform radio MIMO transmission to the reception device 4.

In each of the relay devices 3b, the plurality of antennas 31 receive the respective signal streams transmitted by the transmission device 2a, and outputs the signal streams to the plurality of respective radio reception units 32. The plurality of radio reception units 32 output, to the respective lattice base reduction processing units 38, the signal streams received via the plurality of respective antennas 31. The signal stream received by each of the radio reception units 32 includes noise.

The plurality of lattice base reduction processing units 38 transform the bases of the signal streams output by the plurality of respective radio reception units 32, to increase the orthogonality of the lattice of the signal streams, and output the signal streams to the MIMO equalization unit 37.

The MIMO equalization unit 37 detects, by equalization, reception symbols in the signal streams transformed by the plurality of respective lattice base reduction processing units 38, and outputs the reception symbols to the symbol quantization unit 33.

Figure 2:
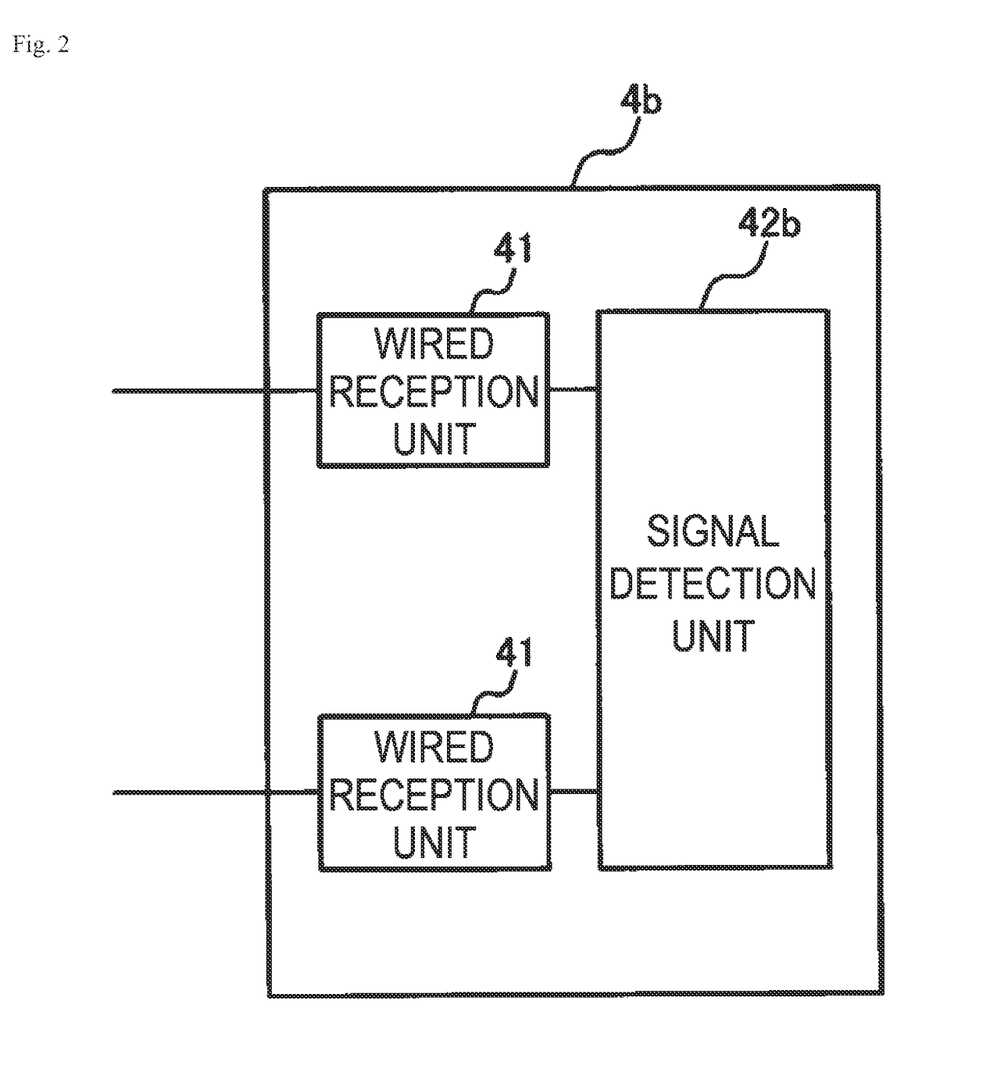
FIG. 2 is a diagram illustrating a configuration example of a reception device.

Now, another configuration example of the reception device 4 (reception device 4b) will be described. FIG. 2 is a diagram illustrating a configuration example of the reception device 4b. The reception device 4b is a reception device that replaces the reception device 4 to constitute a radio communication system in a case where the relay device 3a of the radio communication system 1a illustrated in FIG. 8 is replaced with the relay device 3b.

The reception device 4b includes, for example, the two wired reception units 41, which are identical in number to the relay devices 3b, and a signal detection unit 42b. Each of the wired reception units 41 receives a signal transmitted from a corresponding one of the relay devices 3b by wire and outputs the signal to the signal detection unit 42b. The signal detection unit 42b uses a quantization symbol configured in the signal received by the wired reception unit 41 from each of the relay devices 3b, to determine reception bits by detecting the signal streams with the bases transformed by the lattice base reduction processing units 38 of the relay device 3b.

Now, the operation of the radio communication system 1a including the relay devices 3b (FIG. 1) and the reception devices 4b (FIG. 2) respectively replacing the relay devices 3a (FIG. 8) and the reception devices 4. First, the operation of the transmission device 2a and the relay device 3b will be described in detail.

Hereinafter, thick lower case letters represent vectors, and thick upper case letters represent matrices. Furthermore, the transmission device 2a is assumed to perform transmission through M antennas, and the relay device 3b (relay device #i) is assumed to perform reception through N antennas 31. In addition, in the following description, transmission and reception samples at a point of time k are assumed to be dealt with, and k is not expressly mentioned.

The transmission device 2a uses average energy indicated in Equation (4) below to transmit a space-time region transmission symbol vector of a size M×1 indicated in Equation (5) below, to the relay device #i via a MIMO channel.

[Math. 4]

$$E\{|x^c|^2\} = E_s \qquad (4)$$

[Math. 2]

$$x^c = [x_1^c, x_2^c, \ldots, x_M^c]^T = \{X_0, X_1, \ldots, X_{L-1}\}^{M \times 1} \in \mathbb{C}^{M \times 1} \qquad (5)$$

$\mathbb{C}^{a \times b}$: complex number field with a size of $a \times b$.

The relay device #i observes a vector represented by Equation (7) below as a space-time region reception symbol vector represented in Equation (6) below.

[Math. 6]

$$y_i^c = [y_{i,1}^c, y_{i,2}^c, \ldots, y_{i,N}^c]^T \in \mathbb{C}^{N \times 1} \qquad (6)$$

[Math. 7]

$$y_i^c = H_i^c x^c + z_i^c \qquad (7)$$

However, a vector indicated in Equation (8) below is a space-time region complex Gaussian noise according to Expression (9) below, the noise being added by the relay device #i.

[Math. 8]

$$z_i^c = [z_{i,1}^c, z_{i,2}^c, \ldots, z_{i,N}^c]^T \in C^{N \times 1} \qquad (8)$$

[Math. 9]

$$C_N(0, 2\sigma_i^2) \qquad (9)$$

In addition, a matrix indicated in Expression (10) below is a space-time region channel matrix between the transmission device 2a and the relay device #i in a Rayleigh fading environment with a size of N×M at the point of time k.

[Math. 10]

$$H_i^c \in C^{N \times M} \qquad (10)$$

$h_{i,nm}^c$: element in n-th row and m-th column in $H_i^c$

Here, an element in the n-th row and the m-th column is a complex fading coefficient for a channel from an m-th transmit antenna to an n-th antenna 31 of the relay device #i in accordance with Independent and Identically Distributed (IID).

In general, a real number signal model is more manageable in application of lattice base reduction, and thus the relay device #i first transforms a complex number signal model indicated in Equation (7) above into a real signal model indicated in Equations (11) and (12) below.

[Math. 11]

$$y_i = H_i x + z_i \qquad (11)$$

[Math. 12]

$$H_i = \begin{bmatrix} \mathcal{R}[H_i^c] & -\mathcal{J}[H_i^c] \\ \mathcal{J}[H_i^c] & \mathcal{R}[H_i^c] \end{bmatrix}, y_i = \begin{bmatrix} \mathcal{R}[y_i^c] \\ \mathcal{J}[y_i^c] \end{bmatrix}, x = \begin{bmatrix} \mathcal{R}[x^c] \\ \mathcal{J}[x^c] \end{bmatrix}, \qquad (12)$$

$$z_i = \begin{bmatrix} \mathcal{R}[z_i^c] \\ \mathcal{J}[z_i^c] \end{bmatrix} \text{ where } H_i \in \mathbb{R}^{2N \times 2M}, y_i \in \mathbb{R}^{2N \times 1}, x \in \mathbb{R}^{2M \times 1},$$

$z_i \in \mathbb{R}^{2N \times 1}$ and $\mathbb{R}^{a \times b}$: real number field with a size of $a \times b$.

Moreover, the application of lattice base reduction to the MIMO channel matrix is represented as in Equation (13) below.

[Math. 13]

$$\tilde{H}_i = H_i T_i \qquad (13)$$

$\tilde{H}_i$: quasi-orthogonal matrix, and $T_i$: unimodular matrix.

Note that a unimodular matrix refers to a matrix in which all of the elements are integral numbers and the value of a determinant is 1 or −1. Given that such a unimodular matrix is obtained, substituting Equation (13) above into Equation (11) above gives Equations (14) and (15) below.

[Math. 14]

$$y_i = \tilde{H}_i T_i^{-1} x + z_i = \tilde{H}_i b_i + z_i \qquad (14)$$

[Math. 15]

$$b_i = T_i^{-1} x \qquad (15)$$

However, a vector represented by Equation (15) above is a transformed transmission symbol vector indicated in Equation (16) below.

[Math. 16]

$$b_i = [b_{i,1}, b_{i,2}, \ldots, b_{i,M}, b_{i,M+1}, \ldots, b_{i,2M}]^T \in \mathbb{R}^{2M \times 1} \qquad (16)$$

The space domain region channel matrix indicated in Equation (13) above is a quasi orthogonal matrix in which the bases have high orthogonality due to the application of lattice base reduction, and thus signal detection performance can be expected to be improved by allowing application of a signal detection algorithm enabling effective utilization of the high orthogonality. A Lenstra Lenstra Lovasz (LLL) algorithm is a technique for determining an unimodular matrix T.

In a case where the lattice base reduction processing unit 38 performs lattice base reduction, Equation (14) above allows the transformed transmission signal indicated in Equations (15) and (16) above to be considered as a signal (reception symbol) received through the MIMO channel matrix resulting from the transformation in accordance with Equation (13) above. In a general detection technique, spatial filtering indicated in Equation (17) below is applied to the received signal.

[Math. 17]

$$\hat{b}_i = \tilde{W}_i^H y_i = \tilde{W}_i^H \tilde{H}_i b_i + \tilde{W}_i^H z_i = \tilde{\mu}_i b_i + \tilde{v}_i \qquad (17)$$

$\cdot^H$ is conjugated transposition, where $$\hat{b}_i = [\hat{b}_{i,1}, \hat{b}_{i,2}, \ldots, \hat{b}_{i,M}, \hat{b}_{i,M+1}, \ldots, \hat{b}_{i,2M}]^T \in \mathbb{R}^{2M \times 1}$$

Note that a covariance matrix is given by Equations (18) and (19) below.

[Math. 18]

$$\tilde{\mu}_i = \begin{bmatrix} \tilde{\mu}_{i,1} & & & \\ & \tilde{\mu}_{i,2} & & \\ & & \ddots & \\ & & & \tilde{\mu}_{i,M} \end{bmatrix}, \tilde{\mu}_{i,m} \in \mathbb{R}^{2 \times 2} \qquad (18)$$

[Math. 19]

$$E\{\tilde{v}_i, \tilde{v}_i^H\} = 2\sigma_i^2 \begin{bmatrix} \tilde{v}_{i,1} & & & \\ & \tilde{v}_{i,2} & & \\ & & \ddots & \\ & & & \tilde{v}_{i,M} \end{bmatrix}, \tilde{v}_{i,m} \in \mathbb{R}^{2 \times 2} \qquad (19)$$

$E\{\cdot\}$ represents an expected value, $E\{\tilde{v}_i \tilde{v}_i^H\}$ is considered as a diagonal matrix, and $-$ represents an average.

Here, the interference between the plurality of antennas 31 receiving signals is ignored, and Equation (19) above is considered as a diagonal matrix. ZF into which lattice base reduction is introduced is referred to as Lattice Reduction (LR)-ZF, and a weight matrix is given by Equation (20) below.

[Math. 20]

$$\tilde{W}_i^H = (\tilde{H}_i^H \tilde{H}_i)^{-1} \tilde{H}_i^H \qquad (20)$$

After the application of spatial filtering, the lattice base reduction processing unit 38 determines the vector indicated in Equation (17) above to be the nearest integer, and multiplies the vector by a unimodular matrix $T_i$ to obtain an estimated value for the transmission symbol indicated in Equation (21) below.

[Math. 21]

$$\hat{x} = T_i \lfloor \hat{b}_i \rceil \qquad (21)$$

$\lfloor \cdot \rceil$ is a round function.

Figure 3:
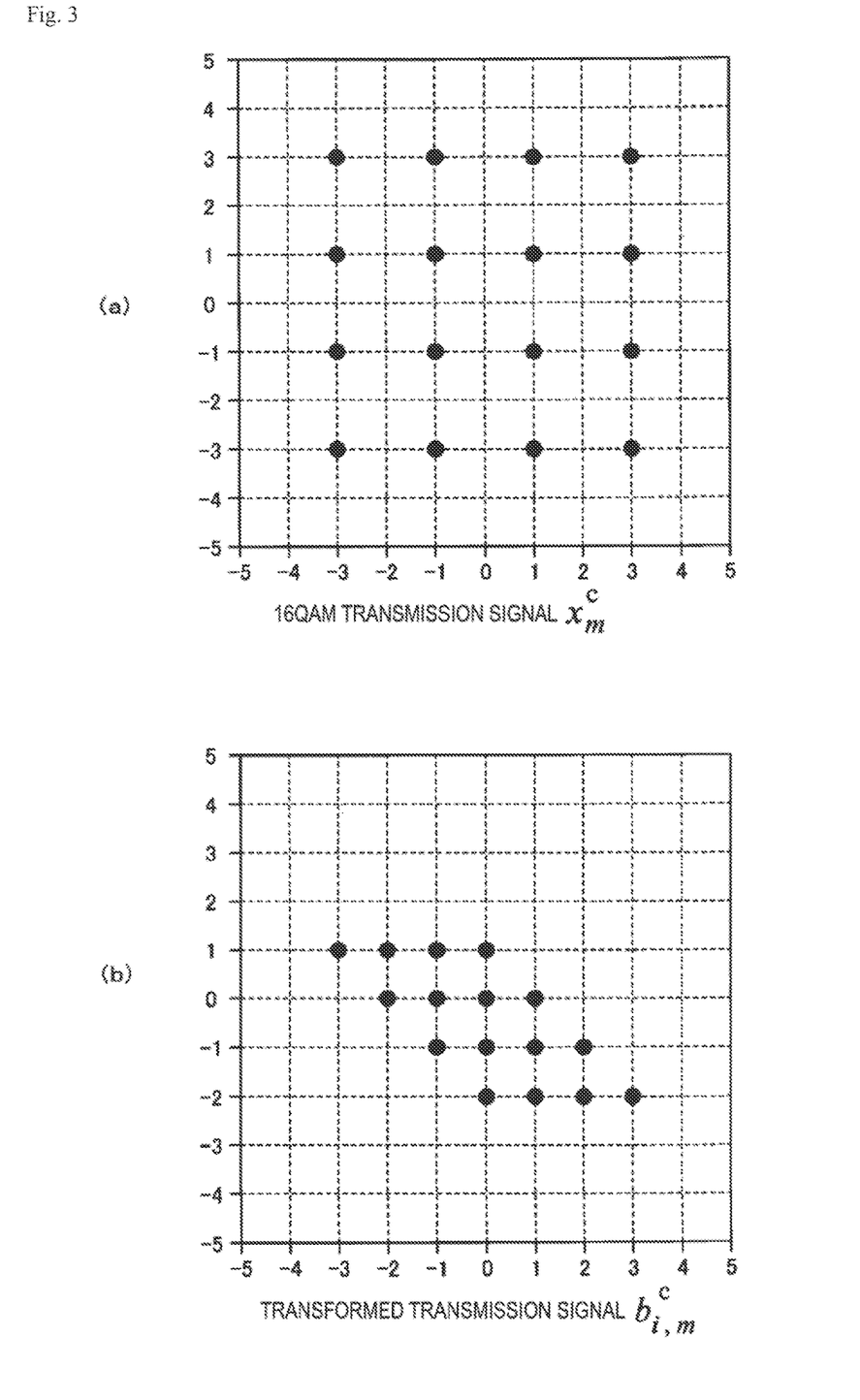

FIG. 3 is a diagram illustrating a signal point arrangement in a case where in 2×2 MIMO, the unimodular matrix $T_i$ is as indicated in Equation (22) below. FIG. 3(a) is a diagram illustrating a signal point arrangement of a 16QAM transmission signal. FIG. 3(b) is a diagram illustrating the signal point arrangement of a transformed transmission signal indicated in Equation (23) below.

[Math. 22]

$$T_i = \begin{bmatrix} 0 & 0 & 1 & 0 \\ 1 & 0 & 1 & 0 \\ 0 & 0 & 0 & 1 \\ 0 & 1 & 0 & 1 \end{bmatrix} \qquad (22)$$

[Math. 23]

$$b_{i,m}^c = b_{i,m} + jb_{i,M+m} \qquad (23)$$

The signal point arrangement of the transformed transmission signal illustrated in FIG. 3(b) is dependent on the unimodular matrix $T_i$, that is, the MIMO channel matrix, and thus, previous notification to the reception device 4b is necessary.

In addition, the same manner of determining quantization grids and cell numbers for the transformed transmission signal illustrated in FIG. 3(b) needs to be configured in advance for each of the relay devices 3b and the reception device 4b. Here, consider a case in which the symbol quantization unit 33 performs symbol quantization using the quantization grid illustrated in FIG. 4. Note that, in the following, the indexes m of the transmission antennas of the transmission device 2a are not described in the transformed transmission signal indicated in Equation (23) above.

Figure 4:
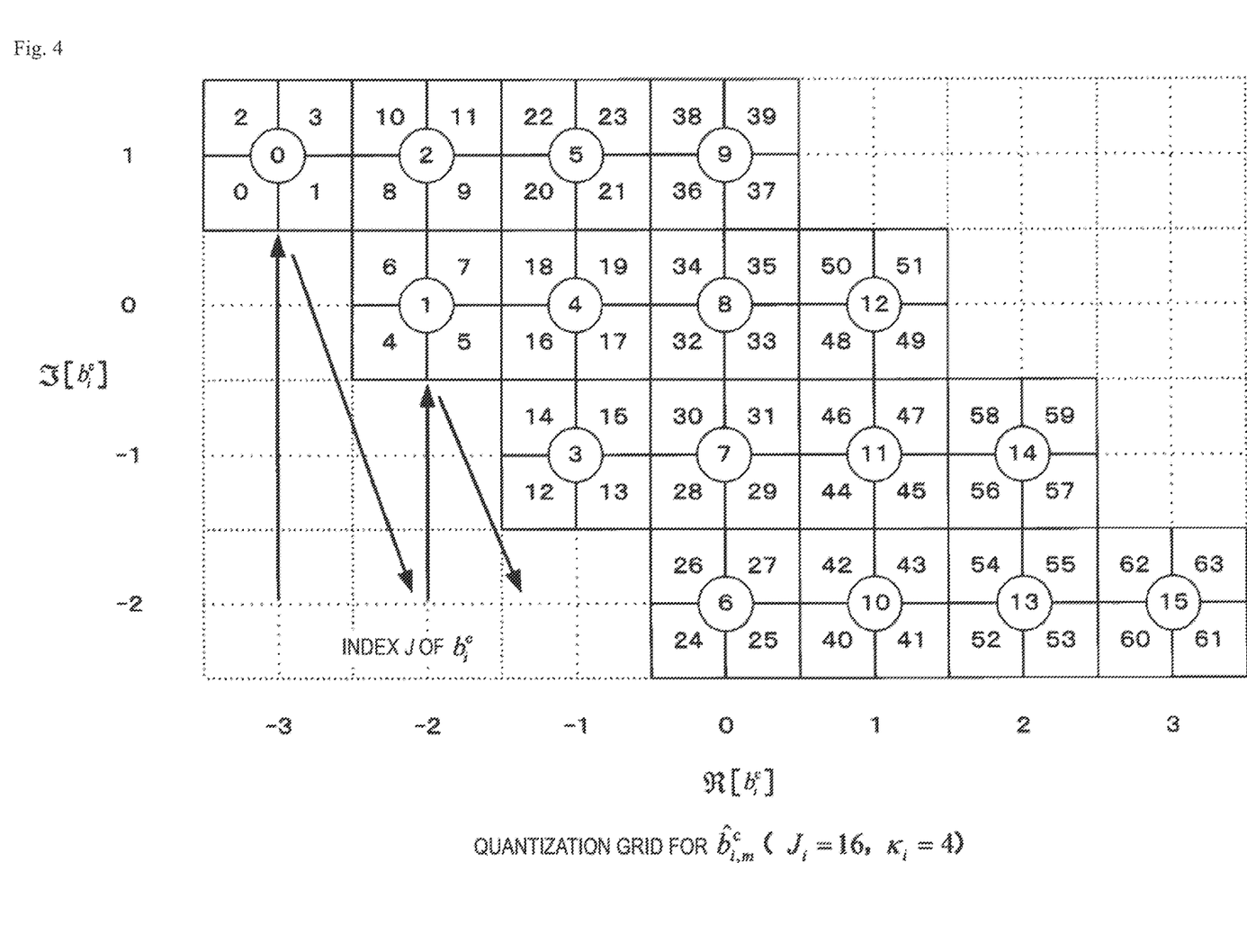
FIG. 4 is a diagram illustrating a quantization grid.

In quantization using the quantization grid illustrated in FIG. 4, first, indexes j in Expression (24) below are added in order from the lower side to the upper side and then from the left side to the right side of the grid, as illustrated by arrows. In this case, $j_i$ is the total number of candidate points that may be taken by the transformed transmission signal indicated in Equation (23) above.

[Math. 24]

$$b_i^c \in \{(b_i^c(0), b_i^c(1), \ldots, b_i^c(j), \ldots, b_i^c(J_i-1)\} \qquad (24)$$

where $J_i$ is the total number of candidate points that may be taken by $b_i^c$ Then, the symbol quantization unit 33 configures $k_i$ cells around a single signal point candidate, and determines the number of a cell indicated in Expression (25) below and to which the transformed transmission signal belongs, to be a quantization symbol indicated in Expression (26) below.

[Math. 25]

$$j\kappa_i + \rho (\rho = 0, 1, \ldots, \kappa_i - 1) \qquad (25)$$

$\kappa_i$: the number of cells configured around one signal point candidate.

[Math. 26]

$$q_{i,m} \in \{0, 1, \ldots, J_i \kappa_i - 1\} \qquad (26)$$

An increased number of transmit antennas make $J_i$ larger than the number of original symbol candidate points L, and thus, in a case where the quantization level is configured as indicated in Equation (27) below, the resulting quantization symbol needs to be compressed to the quantization level. In a case where a compression method at regular intervals is applied, a compressed value is represented by Expression (28) below.

[Math. 27]

$$\tilde{q}_{i,m} = \left\lfloor q_{i,m} \cdot \frac{Q_i}{J_i K_i} \right\rfloor \quad (27)$$

$Q$: quantization level, where $\lfloor \cdot \rfloor$ is a floor function.

[Math. 28]

$$\tilde{q}_{i,m} \in \{0, 1, \ldots, Q_i - 1\} \quad (28)$$

The wired transmission unit 34 transfers the compressed value represented by Expression (28) above, to the reception device 4b via a wired optical fiber or the like.

Now, the operation of the reception device 4b will be described in detail. The signal detection unit 42b of the reception device 4b calculates a probability mass function (PMF), based on a quantization symbol configured for the signal received by the wired reception unit 41, and performs signal detection.

By defining the region of the cell to which a quantization symbol qi belongs as follows, the probability mass function is represented by Equations (29) and (30) below.

[Math. 29]

$$P[q_{i,m} \mid b_i^c] = \int_{D(q_{i,m})} p(\xi \mid b_i^c) d\xi \quad (29)$$

$D(q_i)$: a region of the cell to which the quantization symbol $q_i$ belongs.

[Math. 30]

$$p(\hat{b}_{i,m}^c \mid b_i^c) = \frac{1}{\pi \tilde{\sigma}_i^2} \exp\left[-\frac{|\hat{b}_{i,m}^c - b_i^c|^2}{\tilde{\sigma}_i^2}\right] \quad (30)$$

In a case where LR-ZF is used, the signal detection unit 42b performs calculation of Equation (31) below.

[Math. 31]

$$\tilde{\sigma}_i^2 = \frac{\sigma_i^2}{M} \sum_{m=1}^{M} \frac{tr[\tilde{v}_{i,m}]}{(tr[\tilde{\mu}_{i,m}])^2} \quad \text{where } tr[\cdot] \text{ means a trace of a matrix.} \quad (31)$$

Now, the signal detection unit 42b calculates a PMF indicated in Equation (32) below, based on the PMF in accordance with Equations (29) and (30) above.

[Math. 32]

$$P[\tilde{q}_{i,m} \mid b_i^c] = \sum_{\{q_{i,m} \mid q_{i,m} \to \tilde{q}_{i,m}\}} P[q_{i,m} \mid b_i^c] \quad \text{where} \quad (32)$$

$\{q_{i,m} \mid q_{i,m} \to \tilde{q}_{i,m}\}$ means a set of $\tilde{q}_{i,m}$ compressed to $q_{i,m}$ The signal detection unit 42b observes a vector indicated in Equation (33) below, and then calculates an estimated value of a transmission symbol vector indicated in Equations (34) and (35) below.

[Math. 33]

$$\tilde{q}_i = [\tilde{q}_{i,1}, \tilde{q}_{i,2}, \ldots, \tilde{q}_{i,m}]^T \quad (33)$$

[Math. 34]

$$\hat{x} = \underset{x}{\mathrm{argmax}} \; (P[\tilde{q}_1 \mid T_1^{-1} x] P[\tilde{q}_2 \mid T_2^{-1} x]) \quad (34)$$

$$= \underset{x}{\mathrm{argmax}} \; (P[\tilde{q}_1 \mid b_1^c] P[\tilde{q}_2 \mid b_2^c])$$

$$= \underset{x}{\mathrm{argmax}} \; \prod_{m=1}^{M} P[\tilde{q}_{1,m} \mid b_1^c] P[\tilde{q}_{2,m} \mid b_2^c]$$

[Math. 35]

$$\hat{x}^c = [\hat{x}_1, \hat{x}_2, \ldots, \hat{x}_M]^T + j[\hat{x}_{M+1}, \hat{x}_{M+2}, \ldots, \hat{x}_{2M}]^T \quad (35)$$

The above-described equations and expressions are used for a case of two relay devices 3b. However, similar calculation can be performed for three or more relay devices 3b. In addition, the above-described detection processing increases the complexity of calculation consistently with the number of modulation levels L and the number of transmission antennas M. However, the complexity of calculation can be reduced by applying an algorithm such as a Sphere Detection (SD) method.

Furthermore, in a case where the relay device 3b creates a probability mass function (PMF) for signal detection, the signal point arrangement of a transformed transmission signal is needed, in addition to the variance also required in the related art. However, the transformed transmission signal is a complex number, and the number of signal points increases as the number of modulation levels increases, so the required band is large.

On the other hand, the transformed transmission signal can be reproduced from the channel matrix or the unimodular matrix. The channel matrix is also a complex number, and transmission of a quantized channel matrix increases a required band.

However, for the unimodular matrix $T_i$, the value of the determinant is expressed as 1 or −1, leading to a reduced band required for transmission. Thus, the relay device 3b transmits the unimodular matrix $T_i$ to the reception device 4b in order for the reception device 4b to perform signal detection. The unimodular matrix $T_i$ is calculated for each channel estimation, and thus this information transmission may be limited only to the transfer during the period when the channel estimation is performed.

Figure 5:
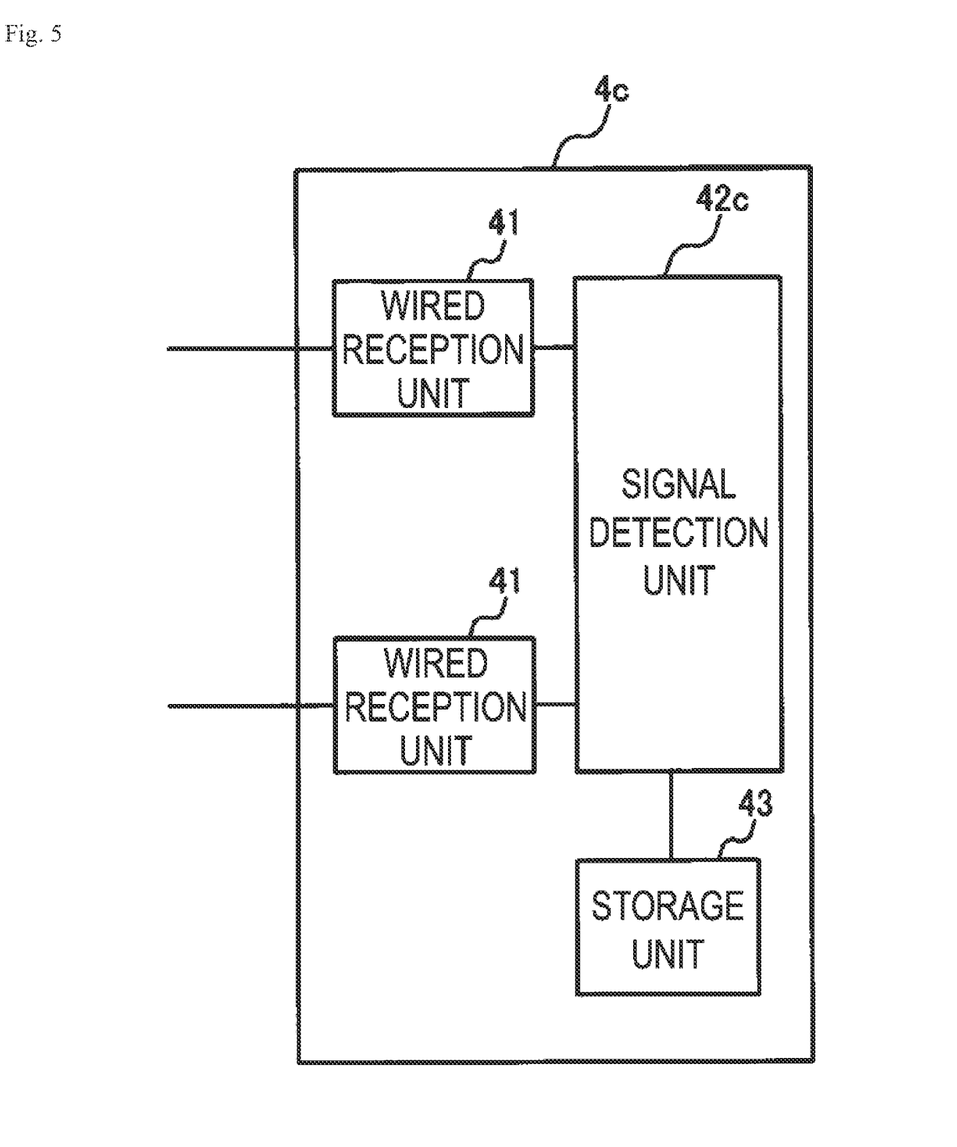
FIG. 5 is a diagram illustrating a configuration example of a reception device.

Now, a modified example of the reception device 4b (reception device 4c) will be described. FIG. 5 is a diagram illustrating a configuration example of the reception device 4c. The reception device 4c replaces the reception device 4b (FIG. 2) to constitute a radio communication system in a case where the relay devices 3a of the radio communication system 1a illustrated in FIG. 8 is replaced with the relay devices 3b (FIG. 1).

The reception device 4b described above calculates the PMF for each of all possible uncompressed quantization symbol values in accordance with Equation (29) above, and uses the calculated PMF to calculate the PMF indicated in Equation (32) above. Performing calculation of the PMF for each symbol every time may increase the complexity of calculation. On the other hand, the transformed transmission signal is changed only in the period when the channel matrix is changed.

Thus, the reception device 4c calculates the PMF for each of all the quantization symbols by using Equation (32) above and stores the calculated PMF in advance. Then, in executing the calculation indicated in Equation (34) above, the reception device 4c reads the calculation result for the PMF corresponding to the quantization symbol transmitted from the relay device 3b, consequently reducing calculation delay while preventing an increase in the complexity of calculation.

For example, the reception device 4c includes the two wired reception units 41, which are identical in number to the relay devices 3b, a signal detection unit 42c, and a storage unit 43. Each of the wired reception units 41 receives a signal transmitted from a corresponding one of the relay devices 3b by wire and outputs the signal to the signal detection unit 42c.

The storage unit 43 stores, as a table, probability mass functions calculated in advance for the respective quantization symbols obtained by the symbol quantization unit 33 of the relay device 3b by quantizing the reception symbols.

Each time the quantization symbol is input from the signal detection unit 42c, the signal detection unit 42c reads the probability mass function stored in the storage unit 43 to detect a signal stream, and determines an estimated value (reception bits) of the transmission symbol vector.

Note that in a case where the relay device 3b transfers the unimodular matrix $T_i$ to the reception device 4b or the reception device 4c, the reception device 4b or the reception device 4c needs to perform the calculation indicated as Equation (15) above. This may increase the complexity of calculation.

However, in a case where the transformed signal point arrangement is transferred from each of the relay devices 3b to the reception device 4b or the reception device 4c, the complexity of calculation in the reception device 4b or the reception device 4c decreases in spite of an increase in the required band between the relay device 3b and the reception device 4b or the reception device 4c.

Thus, the reception device 4b or the reception device 4c may be configured to provide control such that the information transferred from the relay device 3b is limited to one of the transformed signal point arrangement or the unimodular matrix. For example, the wired transmission unit 34 of the relay device 3b transmits the reception symbol detected by the MIMO equalization unit 37 or a predetermined unimodular matrix, based on a request from the reception device 4b or the reception device 4c.

In this way, the relay device 3b increases the orthogonality of the bases of the channel matrix by lattice base reduction to reduce determination errors while suppressing an increase in the complexity of calculation.

Note that a part of each of the functions of the relay device and the reception device described above may be implemented using hardware such as an Application Specific Integrated Circuit (ASIC), a Programmable Logic Device (PLD), or a Field Programmable Gate Array (FPGA). Additionally, the relay device and the reception device may include a Central Processing Unit (CPU), a memory, an auxiliary storage device, and the like that are connected together through a bus and execute programs to implement some of the functions described above.

The program may be recorded in a computer-readable recording medium.

The computer-readable recording medium is, for example, a portable medium such as a flexible disk, a magneto-optical disk, a ROM or a CD-ROM, or a storage device such as a hard disk drive built into a computer system. Additionally, the program may be transmitted via an electrical communication line.

The embodiments of the present invention have been described above in detail with reference to the drawings. However, specific configurations are not limited to those embodiments, and include any change or the like within the scope not departing from the gist of the present invention.

REFERENCE SIGNS LIST

1 Radio communication system
2, 2a Transmission device
3, 3a, 3b, 3c Relay device
4, 4b, 4c Reception device
31 Antenna
32 Radio reception unit
33 Symbol quantization unit
34 Wired transmission unit
37 MIMO equalization unit
38 Lattice base reduction processing unit
41 Wired reception unit
42, 42b, 42c Signal detection unit
43 Storage unit

The invention claimed is:

1. A radio communication system comprising:
a reception device; and
a relay device configured to relay a signal stream transmitted by a transmission device through MIMO transmission to the reception device,
wherein the relay device includes
a lattice base reduction processing unit configured to transform bases of the signal stream transmitted by the transmission device through MIMO transmission, to increase orthogonality of a lattice of the signal stream,
a MIMO equalization unit configured to detect, by equalization, reception symbols in the signal stream with the bases transformed by the lattice base reduction processing unit,
a symbol quantization unit configured to perform quantization by mapping the reception symbols detected by the MIMO equalization unit, to a region on a complex plane delimited by quantization threshold values, and
a transmission unit configured to transmit, to the reception device, at least a signal quantized by the symbol quantization unit, and
the reception device includes
a reception unit configured to receive the signal transmitted by the transmission unit and
a signal detection unit configured to detect the signal stream with the bases transformed by the lattice base reduction processing unit, in the signal received by the reception unit.

2. The radio communication system according to claim 1, wherein the reception device further includes a storage unit configured to store probability mass functions calculated in advance for respective quantization symbols obtained by the symbol quantization unit by quantizing the reception symbols, and
the signal detection unit detects the signal stream by using the probability mass functions stored in the storage unit.

3. The radio communication system according to claim 1, wherein the transmission unit transmits the reception symbols detected by the MIMO equalization unit or a predetermined unimodular matrix, based on a request from the reception device.

4. A relay device for relaying, to a reception device, a signal stream transmitted by a transmission device through MIMO transmission, the relay device comprising:

a lattice base reduction processing unit configured to transform bases of the signal stream transmitted by the transmission device through MIMO transmission, to increase orthogonality of a lattice of the signal stream;

a MIMO equalization unit configured to detect, by equalization, reception symbols in the signal stream with the bases transformed by the lattice base reduction processing unit;

a symbol quantization unit configured to perform quantization by mapping the reception symbols detected by the MIMO equalization unit, to a region on a complex plane delimited by quantization threshold values; and a transmission unit configured to transmit, to the reception device, at least a signal quantized by the symbol quantization unit.

5. The relay device according to claim 4, wherein the transmission unit transmits a reception symbol detected by the MIMO equalization unit or a predetermined unimodular matrix, based on a request from the reception device.

6. A reception device for receiving, via relay by a relay device, a signal stream transmitted by a transmission device through MIMO transmission, the reception device comprising:

a reception unit configured to receive the signal relayed by the relay device; and a signal detection unit configured to detect the signal stream with bases transformed in the signal received by the reception unit, to increase orthogonality of a lattice of the signal stream, based on a signal quantized by mapping symbols of the signal stream with the bases transformed, to a region on a complex plane delimited by quantization threshold values.

7. The reception device according to claim 6, further comprising a storage unit configured to store probability mass functions calculated in advance for respective quantization symbols obtained by quantizing symbols of the signal stream with the bases transformed, wherein the signal detection unit detects the signal stream by using the probability mass functions stored in the storage unit.

* * * * *